United States Patent Office 3,426,006
Patented Feb. 4, 1969

3,426,006
PROCESS FOR THE PRODUCTION OF POLYMERS OF CONJUGATED DIENES
Karl Nützel, Cologne-Stammheim, and Hermann Holzrichter, Bergisch-Neukirchen, Germany, assignors to Farbenfabriken Bayer Aktiengesellschaft, Leverkusen, Germany, a corporation of Germany
No Drawing. Filed Jan. 4, 1965, Ser. No. 423,338
Claims priority, application Germany, Jan. 22, 1964, F 41,804
U.S. Cl. 260—83.5         12 Claims
Int. Cl. C08f 1/28, 3/16; C08d 1/14

ABSTRACT OF THE DISCLOSURE

Process for producing substantally colorless telomers, homopolymers and copolymers of conjugated diolefins comprising utilizing as polymerization catalyst a compound of the general formula:

$$Me—X(R)_y$$

wherein

Me is an alkali metal;
X is phosphorus, tin or lead;
R is a hydrocarbon; and
y is 2–3;

the Me—X bond being a homopolar bond.

---

The polymerization of conjugated dienes, such as butadiene or isoprene, to liquid, semi-solid or solid polymers by means of alkali metals or organic compounds of alkali metals, has long been an established part of the polymerization art. It is also known that conjugated dienes can be copolymerized with unsaturated compounds such as styrene by means of alkali metals or their organic compounds. Unfortunately, the polymers formed are almost always deep-colored oils or elastomers, and considerable technical effort is involved in the production of only weakly colored products with, for instance, color values of 2 to 3 on the iodine color scale. Those improved products can only be obtained by using organic lithium compounds which are fairly difficult to obtain and to handle. Colorless polymers are necessary for many industrial purposes, for example, the manufacture of rubber products such as white-wall tires which contain bright-colored reinforcing fillers.

It has now been found possible to obtain almost colorless polymers of conjugated dienes, i.e. both homopolymers of conjugated diolefins and copolymers of conjugated diolefins, both with other conjugated diolefins and with other copolymerizable monomers, by employing, as polymerization catalysts, compounds of the general formula $$Me—X(R)_y$$

in which Me represents an alkali metal, especially lithium sodium and potassium, X represents a phosphorus, tin or lead atom and R represents an aliphatic, aromatic or cycloaliphatic hydrocarbon radical which, optionally, may contain an alkoxy group or a tertiary amine group, and in which y represents the valency of the atom X, reduced by the number 1, i.e. represents either the number 2 or the number 3.

The polymerization catalysts described above which may be used in the process according to the invention, are compounds which have a homopolar bond between the atom X in the above formula and the alkali metal atom, i.e. they do not have a complex structure. The aliphatic radical R as defined above is preferably an alkyl radical with 1 to 8 carbon atoms, for example, a methyl, ethyl, propyl or butyl radical, or the corresponding isoalkyl radicals. These alkyl radicals may themselves be substituted by a dialkylamino radical, especially dimethylamino and diethylamino radical and/or by an alkoxy, e.g. methoxy and ethoxy. Although a variety of aromatic radicals may be present, compounds containing phenyl radicals and substituted phenyl radicals, e.g. by lower alkyl radicals or by lower alkoxy radicals, e.g. methoxy and ethoxy are preferred. Cycloalkyl radicals having 5 to 7 carbon atoms, especially the cyclohexyl radical or substituted cyclohexyl radicals, e.g. by lower alkyl are preferred examples of cycloaliphatic radicals. "Lower alkyl" throughout this specification is intended to comprise alkyl radicals having 1 to 8 carbon atoms.

The following representatives of this group of compounds are mentioned by way of example:

$KSn(C_2H_4OC_2H_5)_3$
$NaPb(C_6H_5)_2$
$LiSn(C_4H_9)_3$
$NaSn(C_4H_9)_2$—$C_6H_5$
$NaPb(C_2H_5)_3$
$NaPb(C_6H_{11})_3$
$KSn(C_2H_4N(CH_3)_2)_3$

This enumeration is, of course, not complete and not intended to exclude similar types of compounds. The most favorable results are obtained from the process according to the invention if triphenyl- or trialkyl-substituted alkali metal compounds corresponding to the above formula are used as catalyst. The aforementioned compounds may be prepared by processes known per se or by related processes.

The catalysts described in the foregoing are used in polymerization of conjugated diolefins, i.e. both in the homopolymerization of conjugated diolefins and in the copolymerization of such diolefins either with each other or with other copolymerizable monomers, in which case the monomers must, of course, be free from reactive hydrogen atoms, such as in carboxyl hydroxyl, amide or amine groups, in view of the reactivity of the catalysts.

Conjugated diolefins are intended to comprise conjugated diolefins having 4 to 8 carbon atoms and to include, in particular, aliphatic conjugated diolefins with up to 6 carbon atoms, for example butadiene, isoprene and 2,3-dimethyl butadiene. The monomers copolymerizable with conjugated diolefins are preferably vinyl or vinylidene monomers with an activated double bond. Examples are:

(1) Aromatic vinyl or vinylidene compounds such as styrene, divinyl benzene, vinyl toluene, vinyl pyridine or substitution products.

(2) Derivatives of acrylic or methacrylic acid, such as their nitriles, their esters, in particular with 1 to 10 carbon atoms in the alcohol moiety and their N-di-substituted amides, substituents being preferably lower alkyl radicals.

(3) Aliphatic vinyl and vinylidene compounds with an activated double bond, such as vinyl ketones and acrolein.

Preferred comonomers for the purposes of this invention are styrene and esters of acrylic acid or methacrylic acid, the alcohol moiety being preferably a radical of an aliphatic alcohol having 1 to 8 carbon atoms. It is, however, possible to employ other comonomers corresponding to the aforementioned compounds, for example, monomers with a cross-linking action, such as dimethacrylates or polyvinyl benzenes.

When conjugated diolefins are copolymerized with each other the comonomers may be used in any ratio, whilst if copolymerizable monomers with an activated double bond, i.e. vinyl or vinylidene monomers as described above, are used, the amounts should normally not exceed 50% by weight (based on the total monomer content). With styrenes however, the amount is up to 70% by weight.

The polymerization using the aforementioned catalysts is advantageously carried out using pure and dry substances. Air and moisture should be excluded even during polymerization to avoid catalyst loss and cross-linking reactions, and to prevent polymerization from becoming uncontrollable.

The use of protective gas atmospheres, for example of nitrogen or argon, has proved suitable. The polymerization may be carried out without a solvent in suitable apparatus enabling the heat liberated from the reaction to be dissipated, but it is advisable to carry out the polymerization reactions in inert solvents. Suitable inert solvents are, in particular, aliphatic, cycloaliphatic or aromatic hydrocarbons, such as heptane, cyclohexane, decahydronaphthalene, tetrahydronaphthalene, benzene and toluene, but solvents with one or more ether oxygen atoms such as diethyl ether, ethylene glycol dimethyl ether, dioxane, and tetrahydrofuran, may also be used. Aromatic solvents are especially suitable because they induce high polymerization velocities.

Mixtures of aliphatic, cycloaliphatic and aromatic hydrocarbons and compounds with one or more ether oxygen atoms, have a favorable effect on the polymerization velocity. The quantities in which the aforementioned solvents are used may vary within wide limits. The quantity preferably is determined with respect to the final viscosity desired in the resulting polymer solution, i.e. only about 10 to 50% by weight of solvent, based on the total amount of polymer and solvent, are used for the preparation of liquid polymers, whilst about 300 to 500% by weight of solvents are used if it is desired to prepare solid products.

The quantities in which the catalysts of this invention are used, vary between 0.01 and 20% by weight, based on monomer, but they are preferably employed in quantities from 0.01 to 5% by weight, based on monomer. Mixtures of the aforementioned catalysts may also be employed. On the other hand, even larger amounts of catalysts may be employed for special purposes, for example, the incorporation of catalyst terminal groups.

The polymerization temperatures may vary from −20 to +150° C. Temperatures of 50 to 90° C. are preferred for the preparation of oily or semi-solid polymers, whilst temperatures in the range from 0 to 50° C. are preferably used in the preparation of solid polymers.

Polymerization may be carried out in different ways. The solvent may be introduced together with the monomer or monomers, followed by the measured introduction of the catalyst. If it is desired to obtain polymers of low molecular weight, the catalyst is advantageously introduced together with the solvent, followed by the successive introduction of the monomer or monomers. An obvious alternative would be to introduce part of the monomer or monomers together with the catalyst into the solvent, and to add the rest of the monomer or monomers afterwards in measured quantities. Finally, it would even be possible to introduce a monomer, together with the catalyst, into the solvent, and gradually to add a second monomer to the polymerization mixture.

Recovering the polymer is fairly straightforward. The catalyst is deactivated with proton-active substances, such as organic or inorganic acids, water, alcohols, phenols, ion exchangers and other solids which may be regarded as solid acids. Organic acids such as acetic acid, valeric acid or stearic acid are preferably used, since the reaction products of these acids with the catalysts are soluble in the monomer, so that filtration or decantation of the polymer solutions or of the liquid polymers is obviated. If it is intended to use the solid polymers for the manufacture of rubber products, it is advisable to add the usual quantities of anti-agers to the polymer solutions. Eminently suitable are anti-agers which do not discolor the product, such as 2,2′-dihydroxy-3,3′-di-t-butyl-5,5′-dimethyl diphenyl methane, 2,6-di-t-butyl-4-methylphenol and 4-hydroxy-3,5-di-t-butyl-methylbenzyl ether. Anti-agers which do discolor may also be used, for example, distyryl diphenylamine, cyclohexylamine and diphenyl amine. The anti-agers may, of course, also be worked into the isolated elastomers. The solvents can be removed by known methods, for example, by distillation in vacuo or at normal pressure, or by introducing the solution into hot or boiling water.

The solid polymers obtained by the process of the invention are colorless and transparent or, at most, slightly yellowish products which may be processed by the accepted methods of the rubber-processing industry, for example, working in the conventional fillers and anti-agers, and by conventional vulcanizing, processes, with a view to the manufacture of any type of rubber product. The polymers are particularly suitable for the manufacture of rubber products containing bright-colored reinforcing fillers.

The liquid polymers are substantially clear and have values of 0 to 2 on the iodine color scale and are suitable for use as plasticizers, tackifiers and as viscosity increasing agents, particularly where the use of colorless materials is of industrial importance.

The parts given in the following examples are parts by weight, unless otherwise indicated.

EXAMPLE 1

A 1-litre four-necked flask equipped with a stirrer, reflux condenser, thermometer, inlet pipe and dropping funnel, is first exhausted and then the pressure is restored to normal with nitrogen. 100 parts of toluene are introduced and a solution of 3.5 parts of potassium diphenyl phosphine in 20 parts of warm dioxane are added. Butadiene is introduced through the inlet pipe with vigorous stirring and, at the same time, 100 parts of pure distilled isoprene are introduced dropwise into the mixture through the dropping funnel. The temperature reaches 80° C. in 6 minutes and is kept at this level by external cooling unit with a mixture of ice and common salt. After 55 minutes, all the isoprene has been added and polymerization is stopped by adding 5 cc. of glacial acetic acid. The orangered viscous solution turns yellow; after the addition of another 5 cc. of glacial acetic acid, it becomes colorless and clear. After the toluene and dioxane have been distilled off in vacuo, 420 parts of a highly viscous, colorless oil are obtained.

EXAMPLE 2

600 parts of heptane, 50 parts of freshly distilled styrene and 100 parts of butadiene are introduced into a three-necked flask of the type described in Example 1, and then 0.2 part of lithium tributyl tin, dissolved in 20 parts of diethyl ether, are added with stirring. Polymerization begins immediately, as indicated by the rise in temperature and the temperature is kept at 20° C. by cooling in an ice bath. After 2 hours, polymerization is quenched with 6 parts of stearic acid and the highly viscous solution is stabilized with 1 part of 2,2′-dihydroxy-3,3′-di-t-butyl-5,5′-dimethyl diphenyl methane and the solution is poured into 3 litres of methanol. The polymer (122 parts) is precipitated and dried; it has a slightly yellowish tinge.

EXAMPLE 3

Example 2 is repeated, but with the following modification: A suspension of lithium tributyl tin in 10 parts of toluene is used and, instead of being poured into 3 litres of isopropanol, the polymer solution is slowly added dropwise to water at 93° C. After the solvent has been distilled off, the polymer is collected and dried. The yield of the polymer which has a slight yellowish tinge, comprises 102 parts.

EXAMPLE 4

In accordance with Example 1, 250 parts of butadiene are polymerized with a suspension of 3 parts of sodium triethyl lead in 10 parts of toluene, to give a highly viscous colorless oil.

EXAMPLE 5

In accordance with Example 1, 125 parts of toluene and 3.5 parts of lithium trimethyl tin dissolved in 8 parts of ethylene glycol dimethyl ether, are introduced into a 1-litre four-necked flask. 250 parts of pure isoprene are added dropwise with stirring over a period of 70 minutes, and the temperature is kept at 60° C. On completion of the dropwise addition, polymerization is continued for 10 minutes and then quenched, and the polymer solution is worked up as described. After the toluene has been distilled off, 241 parts of a highly viscous oil with a yellow tinge are obtained.

EXAMPLE 6

As described in Example 1, 100 parts of toluene are introduced into 1-litre four-necked flask. 45 parts of a 10% solution of lithium tri-cyclohexyl tin are added to the toluene. 75 parts of vinyl pyridine are placed in the dropping funnel. Butadiene is now fed in with stirring. The vinyl pyridine is added dropwise over a period of 45 minutes and the temperature is kept at 65° C. On completion of the dropwise addition, the flow of butadiene is shut off and the mixture is stirred for 10 minutes. The polymerization solution is worked up as described above. The yield comprises 425 parts of an almost colorless, pasty polymer. The ethereal lithium tricyclohexyl tin solution is prepared as follows:

1 mol of dry anhydrous stannous chloride is suspended in 500 parts of dry ether and the suspension is cooled to −20° C. 3 mols of lithium cyclohexyl are dissolved with vigorous stirring under an argon atmosphere, added dropwise to 500 cc. of diethyl ether and the mixture is brought to room temperature in stages. The reaction is completed by boiling under reflux. The solution is then adjusted until its concentration is 10% by weight.

We claim:
1. Process for producing polymers of conjugated diolefins which comprises polymerizing about
    (A) 100–50% by weight of a conjugated diolefin and
    (B) 0–50% by weight of a vinyl monomer having an activated double bond and free from active hydrogen at a temperature of about −20 to +150° C. in the presence of a catalytic amount of a compound of the formula

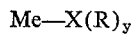

wherein
    Me is an alkali metal;
    X is a member selected from the group consisting of a phosphorus, tin and lead atom;
    R is a member selected from the group consisting of alkyl of 1–8 carbon atoms, dialkylamino-substituted alkyl of 1–8 carbon atoms, alkoxy-substituted alkyl of 1–8 carbon atoms, a phenyl, lower alkyl-substituted phenyl, lower alkoxy-substituted phenyl, cycloalkyl radical of 5–7 carbon atoms and a lower alkyl substituted cycloalkyl radical of 5–7 carbon atoms; and
    $y$ is an integer of 2–3.

2. The process of claim 1 wherein the catalyst is utilized in the amount of about .01%–20% by weight of monomers, the polymerization being effected in the presence of an inert organic solvent.

3. The process of claim 2 wherein the reaction is effected at a temperature of about 50–90° in the presence of about 10–50% by weight of solvent.

4. The process of claim 2 wherein the reaction is effected at a temperature of about 0–50° C. in the presence of about 300–500% by weight of solvent.

5. The process of claim 2 wherein the (A) component is a conjugated diolefin of 4–8 carbon atoms and the (B) component is a vinyl monomer selected from the group consisting of styrene, acrylic acid ester and methacrylic acid ester.

6. Process according to claim 2, wherein said solvent is a member selected from the group consisting of aliphatic, cycloaliphatic or aromatic hydrocarbons and the corresponding ethers.

7. The polymer obtained according to the process of claim 1.

8. The process according to claim 1, wherein the catalyst is potassium diphenyl phosphine.

9. The process according to claim 1, wherein the catalyst is lithium tributyl tin.

10. The process according to claim 1, wherein the catalyst is sodium triethyl lead.

11. The process according to claim 1, wherein the catalyst is lithium trimethyl tin.

12. The process according to claim 1, wherein the catalyst is lithium tricyclohexyl tin.

References Cited

UNITED STATES PATENTS

| | | | |
|---|---|---|---|
| 2,849,432 | 8/1958 | Kibler et al. | 260—94.2 |
| 2,975,160 | 3/1961 | Zelinski | 260—83.7 |
| 3,019,215 | 1/1962 | Kroeper et al. | 260—94.9 |
| 3,324,089 | 6/1967 | Trepka | 260—79.5 |

FOREIGN PATENTS

| | | |
|---|---|---|
| 660,141 | 3/1963 | Canada. |

JOSEPH L. SCHOFER, *Primary Examiner.*

WILLIAM F. HAMROCK, *Assistant Examnier.*

U.S. Cl. X.R.

252—431; 260—83.7, 85.3, 94.2, 94.3, 683.15